United States Patent [19]

Strobel

[11] 4,220,673
[45] Sep. 2, 1980

[54] LOW-TEMPERATURE STEAM DESORBATE PROCESS FOR IMPROVED INSTANT TEA

[75] Inventor: Rudolf G. K. Strobel, Cincinnati, Ohio

[73] Assignee: The Procter & Gamble Company, Cincinnati, Ohio

[21] Appl. No.: 936,951

[22] Filed: Aug. 25, 1978

[51] Int. Cl.² ............................................... A23F 3/02
[52] U.S. Cl. .................................... 426/655; 426/435
[58] Field of Search ................. 426/435, 442, 655, 478

[56] References Cited

U.S. PATENT DOCUMENTS

| | | | |
|---|---|---|---|
| 2,831,772 | 4/1958 | Herz | 426/435 X |
| 3,997,685 | 12/1976 | Strobel | 426/655 X |

*Primary Examiner*—Arthur D. Kellogg
*Attorney, Agent, or Firm*—Leonard Williamson; Rose Ann Dabek; Richard C. Witte

[57] ABSTRACT

A stable water-soluble Desorbate instant tea having a flavor, aroma, appearance and chemical composition approximating that of fresh expertly brewed tea is made by a process comprising passing steam at reduced pressures through a columnar bed of ground tea leaves to pre-wet and pre-swell an upper portion of said leaves; and then passing water and wet steam at reduced pressures and low temperatures through said bed to desorb and extract from said tea leaves an aqueous tea extract while maintaining a weight ratio of said extract to dry tea leaves of from about 0.5:1 to about 3:1, and collecting said extract in a cold trap. Decreaming of the extract prepared by this process is not necessary to provide a water-soluble dry instant tea which, upon reconstitution in water, provides an iced beverage that tastes like an iced tea made from fresh, expertly brewed tea. The solubility and solution stability of the Desorbate tea of this invention are surprisingly improved by treating the process water with a minor amount of a higher chain polyphosphate glass, a bilsulfite, a sulfite and/or a suitable carrageenan.

40 Claims, 6 Drawing Figures

LOW-TEMPERATURE STEAM DESORBATE PROCESS FOR IMPROVED INSTANT TEA

BACKGROUND OF THE PRIOR ART

There are several processes for making instant tea. An excellent reference is a book entitled *Tea and Soluble Tea Products Manufacture* by Nicholas D. Pintauro, Noyes Data Corp., Park Ridge, N.J., U.S.A., 1977, Food Technology Review No. 38.

U.S. Pat. No. 4,004,038, Jan. 18, 1977, to Wickremasinghe, discloses cold soluble tea concentrates and powders prepared by extracting tea leaves with hot water and selectively removing nonpolyphenolic, high molecular weight compounds from the tea extract while retaining the phenolic compounds therein and concentrating the resultant extract.

U.S. Pat. No. 2,970,328 to Melzard, Kendall and Karas, Apr. 4, 1961, discloses the use of short chain polyphosphates to prepare a soluble tea concentrate wherein the tea leaves are extracted with hot water and polyphosphate is added to the aqueous tea extract to combine with substantially all of the calcium ions that will be present in the final tea beverage. But the tea beverage made by Melzard et al. does not taste good due to the large amounts of the polyphosphate additives required to combine with the calcium ions present in most tap waters.

Like polyphosphates, sodium bisulfite is known in instant tea processing art to have certain advantages and disadvantages. In a process described by I. I. Herz, U.S. Pat. No. 2,831,772, Apr. 22, 1958, assigned to Afico SA, a corporation of Switzerland, it is used to make "a highly concentrated tea essence that readily dissolves in cold water" for making iced tea. The "method comprises preparing a hot clear liquid tea essence from tea leaves . . . and dissolving in said aqueous tea essence an amount of a systemically innocuous sulfite to render soluble in cold water the ordinarily cold water insoluble fraction of the tea essence and concentrating . . . ." While this patent teaches the use of bisulfite in hot tea extraction processes, resulting in cold water soluble tea products, many valuable tea aroma and flavor compounds are lost or destroyed. Like the Melzard et al. patent, the levels of additive (bisulfite) taught in Herz adversely affect delicate tea flavor and aroma balance. Such processes remove and/or alter natural tea components.

In my U.S. Pat. Nos. 3,997,685, Dec. 14, 1976, and 3,717,472, Feb. 20, 1973, in Examples 7 the preparation of a Desorbate tea flavor concentrate is taught. Said patents are incorporated herein by reference in their entirety.

The processes taught in my said patents as they relate to tea require an excessive amount of time and water to provide the tea product. These prior art processes teach excessive times and draw-off ratios which yield tea solids concentrations too low in the initial aqueous tea extracts for successful drying. In other words, vastly more time and water are needed for prior art tea desorption processes and when concentrated or dried for a final product much tea flavor and aroma and desired product density are lost.

Thus, it is an object of the present invention to provide an improved desorption process for making an initial aqueous tea extract which has an acceptable tea solids concentration of about 8% or more.

It is another object of the present invention to provide productive processes for high fidelity instant teas.

Another object is to upgrade taste and flavor of instant teas and provide a good-looking cup of tea that tastes like freshly brewed tea, but is less bitter and less astringent than freshly brewed tea.

Yet another object of the present invention is to provide instants which are cold water soluble and have solution stability for iced tea beverages.

BRIEF SUMMARY OF INVENTION

An improved stable cool water-soluble instant tea described by tea-drinking panelists as brewlike/tealike, having a better overall flavor and flavor strength than known commercial instant teas, is made by a process comprising the steps of:

(1) passing steam through a columnar bed of ground tea leaves in such a manner so as to pre-wet and pre-swell an upper portion of said ground tea leaves in said bed, said bed being held at a temperature of below about 65° C. and an absolute pressure of about 13 mbar to about 400 mbar;

(2) slowly passing water and wet steam through said bed in such a manner which avoids flooding of said bed and thereby providing a moving interface between wet swollen tea leaves and substantially dry tea leaves until an initial aqueous tea extract breaks through said bed, said initial aqueous tea extract having a draw-off weight ratio of extract to dry tea leaves of from 0.5:1 to 3:1, said bed being held at said temperature and said pressure until about ½ of said water and wet steam have been applied, and then maintaining a temperature in said bed below about 72° C.;

(3) collecting said initial aqueous tea extract in a cold trap to provide said improved water-soluble tea extract, said cold trap being held at an absolute pressure of about 1 to about 613 mbar and a temperature from about −180° C. to about 20° C.

Chemically, the beverage prepared from the extract resembles feshly brewed tea and contains flavanols, theaflavins, thearubigins, caffeine, amino acids, etc., in approximately the same relative amounts, according to molecular weight distribution and other analytical data, as does freshly brewed tea.

DETAILED DESCRIPTION OF INVENTION

Figure 1:
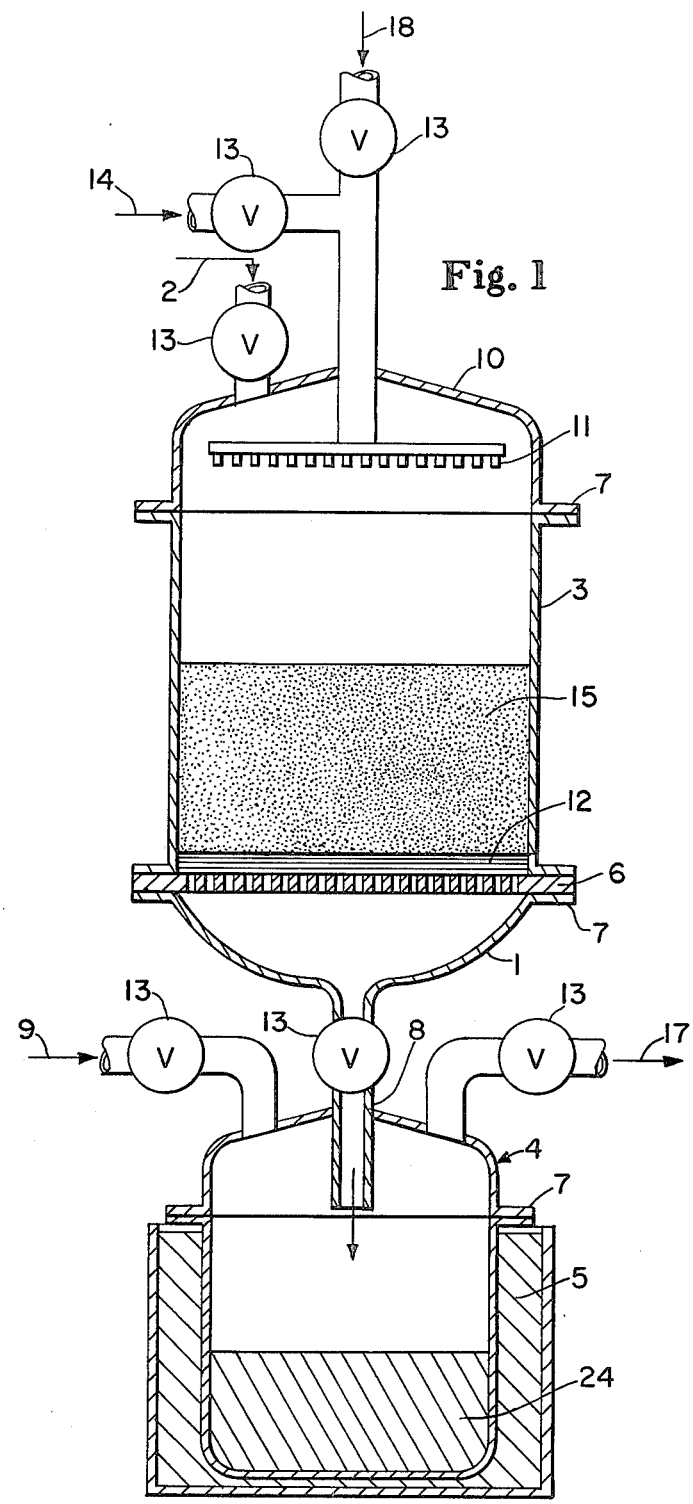
FIG. 1 shows a schematic diagram in cross section of an apparatus adapted to carrying out Desorbate tea extraction. Column section 3 is covered with a lid 10 and supported by a bottom section 1. The column section 3 and the bottom section 1 are separated by a false bottom 6 which is covered with a retaining layer 12 which is composed of cheesecloth, nylon or a stainless steel screen or the like. When column section 3 is charged with substrate tea 15, vacuum 17 is applied through condenser 4 which is submerged in a coolant 5, e.g. liquid nitrogen or dry ice. Solenoid valves 13 are used to regulate the inlet flow rates of steam 14, carbon dioxide 2, inert gas 9, and water 18; steam and water are applied through a nozzle system 11. A condenser inlet warmer 8 prevents frost from plugging up the inlet to the condenser. Flanges 7 hold the various sections and parts of the apparatus together.
Figure 2:
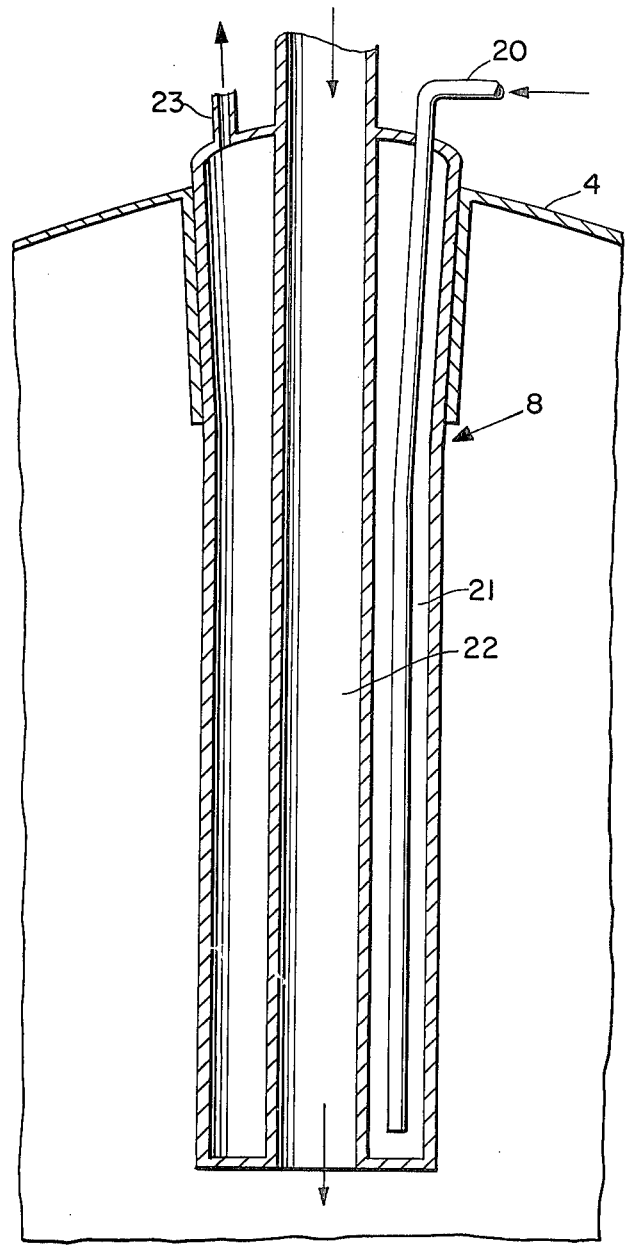
FIG. 2 is a detailed schematic in cross section of condenser inlet warmer 8. Tap water inlet 20 enters inlet warmer 8 and passes through chamber 21 which jackets the tubing 22 which is a conduit for the initial aqueous tea extract condensate 24 to pass from the bottom section 1 of FIG. 1 into the condenser 4. The tap water exits through outlet 23.

Preferred embodiments of the present invention include said summarized process wherein said pre-wetted and pre-swelled upper portion is about 1 to about 30% of said bed; and most preferably wherein said pre-wetted and pre-swelled upper portion is about 10 to about 25% of said bed; and wherein said bed temperature is held below 55° C.; and wherein said bed and said cold trap are both held at an absolute pressure of from about 13 mbar to about 400 mbar and at a temperature of below about 55° C. and said cold trap at a temperature below about 10° C. and a pressure of below about 400 mbar, and wherein said draw-off ratio is from about 0.9:1 to about 2.5:1; and more preferably wherein said bed is held at an absolute pressure of about 25 mbar to about 300 mbar; and wherein said cold trap temperature is below about −60° C.; or wherein said bed has an initial temperature of about 10° C. and said cold trap has an initial temperature cold enough to trap a steam-water desorbed tea aroma and flavor fraction in the form of a frost. Another preferred embodiment includes said process wherein $CO_2$ gas is pulsed through said bed during steps (1) and (2) to increase extraction yields; and wherein said initial aqueous tea extract is dried to provide a stable, cool (20°-25° C.) soft water soluble instant tea, which upon reconstitution provides a tea beverage that tastes like a fresh, expertly brewed tea drink, said reconstituted tea beverage remaining soluble at iced tea temperatures. Of course, a small amount of water can be used with said steam to pre-wet and pre-swell the dry tea leaves in step (1).

Further, "decreaming" of the extract prepared by this process is not necessary to provide a cool water-soluble concentrate or dry product. Concentration or drying of the extract provides a product which dissolves in hot or cool water to give a clear tea beverage that tastes, smells, and looks freshly brewed. Chemically, the beverage prepared from the extract resembles freshly brewed tea and contains flavanols, theaflavins, thearubigins, caffeine, amino acids, etc., in approximately the same relative amounts, according to molecular weight distribution data, as does freshly brewed tea.

Pre-wetting and pre-swelling the dry ground tea leaves in the column before the actual wet-steam water desorption is critical. A typical run with pre-swelling will yield 17% recovery of tea solids at 8.6% concentration when the draw-off ratio is about 2:1. On the other hand, if pre-wetting and pre-swelling are omitted, a high draw-off ratio of about 5:1 is required to get an acceptable yield which results in concentrations of less than 8%. In other words, vastly more water is needed for desorption without pre-wetting and pre-swelling. A recovery of an initial extract having a concentration of at least about 8% is important to getting a preferred final dried product having a preferred density of about 0.05 to 0.15 g/cc, and preferably 0.08 to about 0.12.

It should be noted that about 30% of the tea bed could be pre-wetted and pre-swelled. Preferably, less than the upper quarter and as little as the upper 5% or 10% of the bed is pre-wetted and pre-swelled.

The Desorbate tea of this invention is completely soluble in cool (20°-25° C.) distilled water which can then be iced. However, its solubility in cool tap water ranges from satisfactory in relatively soft tap water (4 grain) to less satisfactory in harder tap water (7 grain and higher) in which a slightly cloudy iced beverage is obtained. Cloudiness increases upon standing, especially in the harder waters.

The importance of maintaining mild desorption temperatures is re-emphasized. Low mild temperatures below 65° C. and preferably below 55° C. should be maintained during at least the first half of a tea desorption run. Whereas coffee desorption can be advantageously executed at temperatures over 65° C., it has been discovered that by keeping the temperature below 65° C. and preferably below 55° C. during the first ½ of a tea run, results in a dried instant with a milder and smoother flavor which surprisingly exhibits improved solubility in cooler water.

The cold, hard water solubility of the Desorbate tea of this invention is surprisingly further improved by treating the process water with a minor but effective amount of an edible water-soluble additive selected from the group consisting of suitable higher chain polyphosphates, sulfites, bisulfites and suitable carrageenans. A preferred additive is a low-calcium lambda-carrageenan. More preferred are alkali metal or ammonium sulfite and bisulfite. More preferred of these is sodium bisulfite which is used at a level of 0.005% to 0.5%, most preferably at 0.01% to 0.04% in the process water. Low-calcium lambda-carrageenan is also used at a level of 0.005% to 0.5%, and preferably at 0.01% to 0.02%, in the process water.

The cold, hard water solubility and solution stability of Desorbate tea prepared by the process of this invention are best improved by treating the process water with a minor but effective amount of a higher chain water soluble polyphosphate.

As used herein, a higher chain polyphosphate contains about 15 to 100 phosphorus atoms per molecule. Most preferable is Glass H ®, which averages 21 phosphorus atoms per molecule. Preferred polyphosphate treated water contains from about 0.005% to about 0.3% of said polyphosphate; and most preferably said polyphosphate treated water contains from about 0.01% to about 0.14% of said polyphosphate. An additional advantage is seen if a little polyphosphate water is sprinkled on a lower portion (5 or 10%) of the tea bed when loading the desorption column before steaming.

The structure of the preferred additive polyphosphate, also referred to as sodium phosphate glass, may be represented as follows:

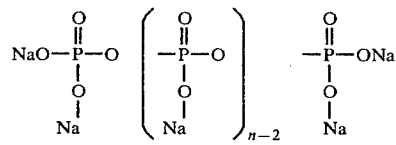

Glass H ®, the most preferred polyphosphate, has a chain length of n=21. Glass H ® may be obtained commercially from FMC Corporation, Inorganic Chemical Division, 633 Third Avenue, New York 10017. FMC's technical bulletin 570-6A "GLASS H" is herein incorporated by reference in its entirety. It has been found that the use of polyphosphates of a higher average chain length than "Hexaphos" (13 phosphorus atoms) is critical to the preparation of Desorbate tea which is soluble in cold, hard water and at the same time retains a clear, fresh brewed tea-like flavor, e.g., Desorbate tea made with process water which contains 0.02% by weight of Glass H ® gives a clear solution in cool (~20° C.), hard (~9 grain) water, but the same water needs nearly 1% "Hexaphos" to achieve this result, and the latter level of "Hexaphos" adversely affects the tea flavor. Additionally, "Hexaphos" does not maintain clarity of solution (solution stability) upon standing, whereas Glass H ® does. Of course, other long chain polyphosphates which are edible and soluble in water other than Glass H ® are useful in the practice of the present invention.

EXAMPLES

The following examples further illustrate the best modes currently contemplated for carrying out the present invention, but must not be construed as limiting the present invention in an unreasonable manner.

EXAMPLE I

Desorbate Tea Preparation

One-half kg of a tea blend consisting of 60% Ceylon BOP, 30% Kenya BOP, and 10% India Assam BOP black teas, was ground on an American Duplex mill. The particle size distribution is shown in the table following below.

| Tea Particle Size Distribution After Grinding | |
|---|---|
| Mesh Size in Microns | Ground Tea Particles in % |
| 1680 | 0.0 |
| 1190 | 0.5 |
| 850 | 14.0 |
| 590 | 32.5 |
| 420 | 25.2 |
| 300 | 14.0 |
| 180 | 9.2 |
| 125 | 2.5 |
| pan | 2.0 |

The particle size distribution shown in the table above is to be maintained within a ±15% deviation limit in the 850 to 420μ range in order to maintain proper flow rates during the desorption steps of processing.

Before loading a 13 cm diameter desorption column with the ground tea, a retaining layer consisting of a nylon netting and 8 layers of cheesecloth were placed on top of the false bottom to prevent the falling of fine tea particles into the condenser. The retaining layers were wetted lightly with water immediately before loading the column.

The ground tea was put into the column and spread out evenly to obtain a substrate bed of uniform height throughout.

The column lid was lowered and the column evacuated to 5 mbar (millibars). At this point the column exit valve was closed and steam was applied through the nozzle system to pre-swell the uppermost layers of the tea bed. Steam was applied until the pressure was increased to 80 mbar. The pressure was then further increased to 130 mbar by applying gaseous $CO_2$ through the $CO_2$ valve located in the lid section.

Boiling water was then applied in spurts through the water valve, a solenoid valve, actuated by a pre-programmed audio type system.

The spurts of water were programmed in such a way to permit the application of 2 liters of water to the tea bed in 33 minutes time. Details about the water application, bed temperatures, head space temperatures of the column and the condenser and the vacuum in the column head are shown in Table I.

Table I

| Time in Minutes | Col. Head mbar | Desorption Parameters Temperature, °C. | | | Water added to column in ml |
|---|---|---|---|---|---|
| | | Column Head | Bed | Condenser Head | |
| Start | 35 | 25 | 24 | −46 | 000 |
| 000 | 130 | 37 | 33 | −46 | 000 |
| 005 | 165 | 51 | 50 | −23 | 500 |
| 010 | 180 | 53 | 50 | −3 | 850 |
| 015 | 220 | 61 | 58 | −6 | 1200 |
| 020 | 300 | 70 | 68 | −1 | 1650 |
| 025 | 230 | 63 | 61 | −19 | 1800 |
| 030 | 275 | 65 | 61 | −13 | 1900 |
| 033 | 285 | 61 | 61 | −11 | 2000 |

The valve located between the condenser and the vacuum pump was closed during the water/steam applications except for approximately 5 minutes to assure the condensing of the highly volatile tea aroma compounds.

The extract exiting the column was 1120 grams containing 9.6% tea solids, thus amounting to a solids yield of 21.5% at a draw-off ratio of 2.24:1 (weight of extract weight of tea leaves).

The extract was condensed under cryogenic conditions (liquid nitrogen bath) in a five-inch (13 cm) diameter condenser. After completion of the run the vacuum of the condenser was released with gaseous nitrogen applied through the nitrogen valve in the condenser lid.

The frozen initial aqueous extract condensate was then removed from the condenser and placed into a plastic bag. The frozen extract was then worked to a plastic consistency. The tea extract was then refrozen over a one-hour period at temperatures starting at −20° C. and decreasing to −100° C.

The frozen concentrate was then crushed, ground on a Buss Condux mill, sieved and the particles ranging from 850 microns to 2800 microns were freeze-dried.

The resulting dry tea product was soluble in cool water and showed a good amber/red tea color. Contrary to conventional instant hot tea, which turns to a gray color when adding milk, hot Desorbate tea showed a good whitish amber color, just as does a freshly brewed hot beverage prepared from tea leaves upon adding milk. The Desorbate tea of this invention makes an excellent hot tea beverage.

The flavor of the beverage was described by an expert taste panel as mild, non-astringent, non-bitter, with a good pleasing tea aroma and flavor. The panel also rated the Desorbate tea beverage higher in tea characteristics than a tea beverage brewed freshly from a good blend of Orange Pekoe and Pekoe cut black tea leaves.

The cold Desorbate tea beverage was clear for approximately 5 minutes after preparation even upon addition of ice to the water. After standing for more than 5 minutes the cold beverage, the same as a tea beverage prepared from tea leaves, turns increasingly cloudy but does not cream like freshly brewed tea.

Table II

| H₂O | Desorbate Tea Solubility | | |
|---|---|---|---|
| | Temp. °C. | Solubility | Color |
| Distilled | 70° | Clear | Normal |
| Tap 12 gr. | 70° | Clear | Darker |
| Distilled | 12° | Clear | Normal |
| Tap 4 gr. | 25° | Clear | Normal |
| Tap 8 gr. | 25° | Slight haze | Darker |
| Tap 12 gr. | 25° | Slight haze | Darker |
| Tap 4 gr. | 12° | Slight haze | Normal |
| Tap 8 gr. | 12° | Cloudy | Darker |
| Tap 14 gr. | 12° | Cloudy | Darker |

Six hundred mg of dry Desorbate tea was dissolved in 150 ml of water of the temperatures and hardnesses indicated in Table II. The terms "slight haze" and "cloudy", as used herein, are to be distinguished from phase separation, often referred to as "creaming" or precipitate formation, and mean "substantially soluble."

EXAMPLE II

Another Desorbate tea was prepared using material and processing conditions set out in Example I, except that fifty grams of the ground tea were put into the column and spread out evenly on the retaining layer. This layer of tea was then sprayed uniformly with 20 ml of water containing 22.5 mg of Glass H ®, a polyphosphate with an average chain length of 21 phosphorus atoms.

Then the remaining 450 grams of the ground tea were put on top of the tea layer sprayed with Glass H ®. The tea was distributed evenly to obtain a substrate bed of uniform height throughout.

The column lid was placed onto the column section and the column evacuated to 5 mbar. At this point the column exit valve was closed and steam was applied through the nozzle system to pre-swell the uppermost layers of the tea bed. Steam was applied until the pressure was increased to 80 mbar. The pressure was then further increased to 130 mbar by applying gaseous $CO_2$ through the $CO_2$ valve located in the lid section.

Boiling distilled water containing 0.03% Glass-H ®, a polyphosphate, was then applied in spurts. See Table III.

Table III

| | | Desorption Parameters | | | |
|---|---|---|---|---|---|
| Time | Head | Temp. in 20°C. | | | Water |
| in Min. | Vacuum in mbar | Column Head | Bed | Condenser Head | Added to Col. in ml |
| — | 27 | 11 | 13 | <0 | — |
| 000 | 120 | 54 | 59 | <0 | 000 |
| 005 | 60 | 49 | 49 | <0 | 300 |
| 010 | 40 | 46 | 45 | <0 | 650 |
| 015 | 40 | 42 | 45 | <0 | 800 |
| 020 | 33 | 41 | 41 | <0 | 950 |
| 025 | 40 | 51 | 45 | <0 | 1100 |
| 030 | 80 | 51 | 49 | <0 | 1300 |
| 035 | 80 | 52 | 50 | <0 | 1500 |
| 040 | 113 | 52 | 52 | <0 | 1800 |
| 043 | 80 | 52 | 52 | <0 | 1800 |

The extract exiting the column was 989 g at 8.6% concentration. This results in a solids yield based on tea leaves of 17% at a draw-off ratio of 1.98:1 (weight of extract/weight of tea leaves).

A Desorbate tea beverage made with the product of Example II was clear after preparation and, contrary to freshly brewed tea or Desorbate tea prepared without addition of Glass-H ®, did not develop any cloudiness upon addition of ice or standing for 3 hours at room temperature.

EXAMPLE III

Another Desorbate tea was prepared using a tea blend, the processing conditions and equipment substantially the same as those used in Example II. However, more tea leaves, 10 kg, a larger desorption column, 60 cm diameter, and a larger trap, 30 cm diameter condenser, were used. The condenser trap was submerged in a liquid nitrogen bath. The time of the run was about 27 minutes. The process water used was about 21 liters containing about 0.03% Glass-H ®. The draw-off ratio was about 1:1; yield 11.3%. The initial aqueous tea extract was about 10 liters (11.3% solids) was immediately removed from the condenser to a plastic bag, worked to plasticity (20 minutes) and frozen solid in about 4 hours. The solid was cold ground, sieved to get particles of 850 to 2800 microns, and freeze dried. This product was less soluble in cold water than the one of Example II. This product density was about 0.084 g/cc.

EXAMPLE IV

The same as Example III except that the plasticized initial aqueous tea extract was frozen solid within a period of about 5 minutes with liquid nitrogen. This Desorbate tea was soluble in cold hard water and showed solution stability upon addition of ice or upon standing at room temperature for three hours.

Thus, a surprising improvement in cold water solubility was noted when the initial aqueous extract was collected under cryogenic or frigid conditions and promptly worked up, fast frozen and freeze dried. In general, it is preferred that the work-up time allowed for removing the initial aqueous extract from the condenser in these runs and freezing it to a solid is less than an hour and preferably within 40 minutes.

Surprising also is an improvement in cold hard water solution stability when a polyphosphate treated process water is used and the resultant initial aqueous extract is fast frozen and freeze dried.

EXAMPLE V

Another Desorbate tea was prepared using the procedure set out in Example II, except that the Glass-H ® treated water was replaced with process water containing 0.03% of sodium bisulfite and 0.01% of low-calcium lambda-carrageenan. Solids concentration of the initial aqueous extract was 8%; draw-off ratio 2.68:1; yield 20.9%; dry density about 0.05 g/cc.

This Desorbate tea showed an improved cold tap (9 grain) water solubility similar to the Glass-H ® Desorbate tea.

EXAMPLE VI

Samples of freshly brewed tea were made and tested for molecular weight distribution using the following procedure:

Four grams of the tea blend used in Examples I–V were steeped in 150 ml of distilled water for 5 minutes. Ten ml of this brew containing about 59 mg of tea solids was applied to a Sephadex ® G 25, 300μ particle size, with a bed height of 43 cm and a 2 cm diameter. The molecular weight distribution of the tea solids contained in this brew were developed using the solvent systems shown in Table IV.

Table IV

Solvent Systems for Sephadex Chromatography

| Solvent | Ml Used | Temp. of Column | UV Measurement |
|---|---|---|---|
| Distilled water | 250 | 22° C. | 280 nm |
| Water/ethanol 1:1 | 200 | 50° C. | 280 nm |
| Water/ethanol/ethylacetate 1:2:3 | 100 | 50° C. | 280 nm |

Figure 3:
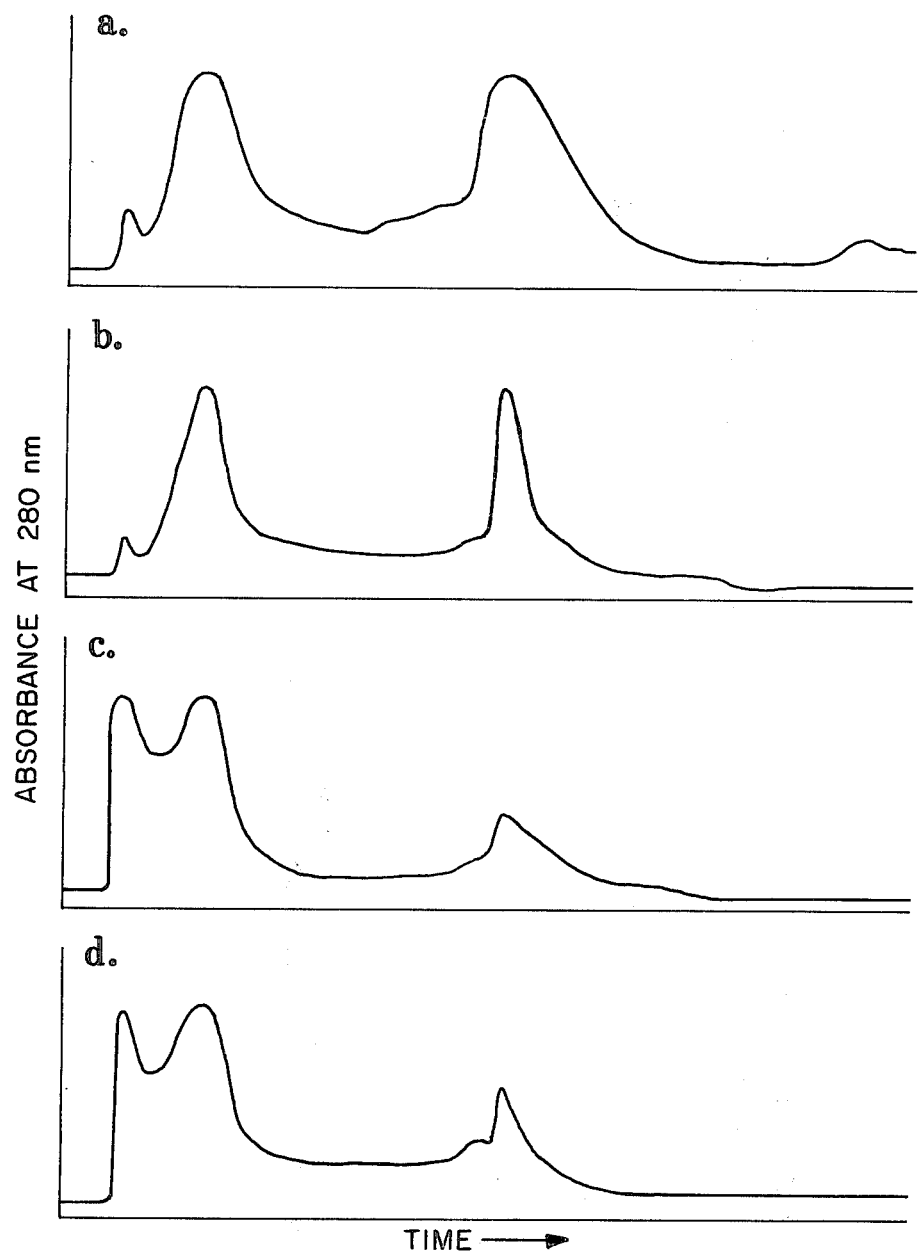
FIGS. 3a-3d show chromatographic elution diagrams of the molecular weight distribution of tea components of Desorbate tea, freshly brewed tea, and two conventional cold water soluble instant teas, respectively.

The tea solids were continuously monitored through an ISCO Model UA2, ultraviolet analyzer at 280 nm. The UV measurements were printed out on a recorder. The print-out curve obtained is shown in FIG. 3b. This curve is compared to the curves of Examples VII–IX.

EXAMPLES VII–IX 100 mg each of the freeze-dried Desorbate tea of Example IV, Nestea ® instant and Lipton ® instant teas were each dissolved in 2 ml of distilled water at 50° C. and each applied to the Sephadex ® column for analysis as in Example VI for their molecular weight distributions. Their molecular weight distributions are respectively shown in FIGS. 3a, 3c and 3d.

The retention time of the curves indicates the relative molecular weight distribution of the tea solids tested. The area under the curves is an indication of the quantity of the molecular weight species. A direct comparison of the various tea samples is made by comparing the relative ratios of the various peaks. The species with the highest molecular weight exit the Sephadex ® column first and are shown on the left hand side of FIG. 3.

Curves 3a and 3b possess a qualitative and quantitative similarity which connotes the chemical and flavor similarity of Desorbate tea and fresh expertly brewed tea, in sharp contrast to the curves of the conventional instant teas.

EXAMPLE X

Blind Iced Tea Taste Test

In order to assess the brew-like flavor of Desorbate tea of Example III, the following blind taste test was conducted:
Three iced tea beverages were prepared:
1 Desorbate tea of Example III, 0.5 g in 150 ml of water.
2 Nestea ® instant tea, 0.5 g in 150 ml of water.
3 Freshly brewed tea, from bags containing a Lipton ® tea blend, one bag per 150 ml hot water steeped for three minutes, then poured over ice.

Each iced tea beverage was tasted by a random panel of women who are iced tea drinkers. For each beverage, the panelists then were asked to judge the tea as brewed or instant. Table V shows the results of this test.

Table V

| | Usual Method of Iced Tea Preparation | | |
|---|---|---|---|
| | Brewed (71 panelists) | Drinkers of Instant (29 panelists) | Total (100 panelists) |
| Thought Product #1 was brewed | 63% | 59% | 62% |
| Thought Product #2 was brewed | 28% | 41% | 32% |
| Thought Product #3 was brewed | 63% | 41% | 57% |

The results of this blind test demonstrate the authentic brew-like flavor of iced Desorbate tea. Note that the instant tea panelists judged the iced Desorbate tea taste as more like freshly brewed tea than freshly brewed tea itself. The brewed tea panelists judged the Desorbate tea taste as brew-like as the freshly brewed tea itself. Note that the panelists are subdivided into brewed tea drinkers and instant tea drinkers. The "Total" column shows the overall results of the test.

What is claimed is:

1. A process for making an improved initial aqueous water soluble tea extract having improved overall fresh brewlike tealike aroma, flavor and flavor strength, said process comprising the steps of:
   (1) pre-wetting and pre-swelling a finite upper portion of a columnar bed of ground tea leaves by passing substantially dry steam through said bed in such a manner so as to pre-wet and pre-swell only an upper portion of said ground tea leaves in said bed, said bed being held at a temperature of below about 65° F. and an absolute pressure of about 13 mbar to about 400 mbar;
   (2) slowly passing water and wet steam through said bed at a flow rate that avoids flooding said bed and thereby providing a moving interface between wet swollen ground tea leaves and substantially dry tea leaves until an initial aqueous tea extract breaks through said bed, continuing the application of said water and wet stream in an amount sufficient to provide an initial aqueous tea extract having a draw-off weight ratio of extract to dry tea leaves of from 0.5:1 to 3:1, said bed being held at said temperature and said pressure until about one-half of said water and wet steam have been applied, and then maintaining a temperature in said bed below about 72° C.;
   (3) collecting said initial aqueous tea extract in a cold trap to provide said improved water soluble tea extract, said cold trap being held at an absolute pressure of about 1 to about 613 mbar and a temperature from about −180° C. to about 20° C.; and
   wherein said improved water soluble tea extract composition which, upon reconstitution in water, comprises flavanols, theaflavins, thearubigins, caffeine, amino acids, and other tea compounds, in approximately the same relative amounts as a freshly brewed tea prepared from a comparable tea blend, and wherein said tea extract is more soluble at temperatures below about 20° C. than freshly brewed tea, wherein said reconstituted tea remains substantially soluble upon cooling with ice.

2. The process of claim 1 wherein said prewetted and pre-swelled upper portion is about 1 to about 30% of said bed.

3. The process of claim 1 wherein said pre-wetted and pre-swelled upper portion is about 10 to about 25% of said bed.

4. The process of claim 1 wherein said bed temperature during step (1) is held below 55° C. and the temperature of said cold trap is about −76° C. to about 0° C.

5. The process of claim 1 wherein said bed and said cold trap are both held at an absolute pressure of from about 13 mbar to about 400 mbar and said bed at a temperature of below about 55° C. during step (1) and said cold trap at a temperature below about 10° C. and a pressure of below about 400 mbar, and wherein said draw-off ratio is from about 0.9:1 to about 2.5:1.

6. The process of claim 5 wherein said bed is held at an absolute pressure of about 25 mbar to about 300 mbar.

7. The process of claim 1 wherein said cold trap temperature is below about −60° C.

8. The process of claim 1 wherein said cold trap has an initial temperature cold enough to trap a steam-water desorbed tea aroma and flavor fraction in the form of a frost in said cold trap.

9. The process of claim 1 wherein an effective amount of $CO_2$ gas is pulsed through said bed during steps (1) and (2) to increase extraction yields and improve tea aroma and flavor fidelity.

10. The process of claim 1 wherein said initial aqueous tea extract is dried to provide a stable water-soluble instant tea, which upon reconstitution provides a substantially clear tea beverage that tastes like a fresh expertly brewed tea drink, said reconstituted tea beverage remaining substantially soluble at iced tea temperatures.

11. The process of claim 10 wherein said initial aqueous tea extract is freeze dried.

12. An improved substantially dry water soluble tea composition made by the process of claim 1 which, upon reconstitution in water, comprises: flavanols, theaflavins, thearubigins, caffeine, amino acids, and other tea compounds, in approximately the same relative amounts as a freshly brewed tea prepared from a comparable tea blend, and wherein said composition has a density of about 0.05 to about 0.15 g/cc, and wherein said tea composition is more soluble at temperatures below about 20° C. than freshly brewed tea, and wherein said reconstituted tea remains substantially soluble upon cooling with ice.

13. The water soluble tea extract of claim 12 wherein said compounds are quantitatively and qualitatively substantially the same as that of a freshly brewed tea prepared from a comparable tea blend as indicated by chemical/molecular weight distribution.

14. The improved water soluble tea extract of claim 12 wherein said tea is made by extracting ground tea leaves under low temperature and low pressure wet-steam conditions, collecting an initial aqueous extract under cryogenic conditions, freezing said aqueous extract solid, grinding and freeze drying to obtain said improved tea extract.

15. In a process for preparing a cold water soluble tea extract wherein an initial aqueous tea extract is prepared from water and ground tea leaves, the improvement comprising:
   (1) treating said water with a minor but effective amount of a higher chain water soluble polyphosphate;
   (2) extracting said ground tea leaves with said polyphosphate treated water, under low pressure and low temperature wet-steam conditions; and
   (3) collecting said aqueous tea extract in a cold trap to provide an improved cold water soluble tea extract, said amount of said polyphosphate being effective to make said initial aqueous tea extract and powdered extract made therefrom completely soluble in cold, hard water with sustained solution stability.

16. The process of claim 15 wherein said process comprises the steps of:
   (1) passing steam through a columnar bed of ground tea leaves in such a manner so as to pre-wet and pre-swell only an upper portion of said ground tea leaves in said bed, said bed being held at a temperature of below about 65° C. and an absolute pressure of about 13 mbar to about 400 mbar;
   (2) slowly passing polyphosphate treated water and wet steam through said bed in such a manner which avoids flooding of said bed and thereby providing a moving interface between wet swollen tea leaves and substantially dry tea leaves until an initial aqueous tea extract breaks through said bed, said initial aqueous tea extract having a draw-off weight ratio of extract to dry tea leaves of from 0.5:1 to 3:1, said bed being held at said temperature and said pressure until about ½ of said water and wet steam have been applied, and then maintaining a temperature in said bed below about 72° C.;
   (3) collecting said initial aqueous tea extract in a cold trap to provide said improved water soluble tea extract, said cold trap being held at an absolute pressure of about 1 to about 613 mbar and a temperature from about −180° C. to about 20° C.

17. The process of claim 15 wherein said higher chain polyphosphate has an average of from about 15 to about 30 phosphorus atoms, and wherein said polyphosphate-treated water contains from about 0.005% to about 0.3% of said polyphosphate.

18. The process of claim 17 wherein said polyphosphate-treated water contains from about 0.01% to about 0.1% of said polyphosphate.

19. The process of claim 16 wherein some of said polyphosphate-treated water is sprinkled on a lower portion of said bed.

20. The process of claim 16 wherein said pre-wetted and pre-swelled upper portion is about 1 to about 30% of said bed.

21. The process of claim 16 wherein said pre-wetted and pre-swelled upper portion is about 10 to about 25% of said bed.

22. The process of claim 15 wherein said bed and said cold trap are both held at an absolute pressure of from about 13 mbar to about 400 mbar and said bed at a temperature of below about 55° C. during step (1) and said cold trap at a temperature below about 10° C. and a pressure of below about 400 mbar, and wherein said draw-off ratio is from about 0.9:1 to about 2.5:1.

23. The process of claim 22 wherein said bed is held at an absolute pressure of about 25 mbar to about 300 mbar.

24. The process of claim 15 wherein said cold trap temperature is below about −60° C.

25. The process of claim 15 wherein said cold trap has an initial temperature cold enough to trap a steam-water desorbed tea aroma and flavor fraction in the form of a frost in said cold trap.

26. The process of claim 15 wherein an effective amount of $CO_2$ gas is pulsed through said bed during steps (1) and (2) to increase extraction yields and improve tea aroma and flavor fidelity.

27. The process of claim 15 wherein said initial aqueous tea extract is dried to provide a stable water-soluble instant tea, which upon reconstitution provides a substantially clear tea beverage that tastes like a fresh expertly brewed tea drink, said reconstituted tea beverage remaining substantially soluble at iced tea temperatures.

28. The process of claim 15 wherein a minor amount of water is also used to pre-wet and pre-swell said upper portion of said ground tea leaves.

29. The process of claim 15 wherein said bed temperature during step (1) is held below 55° C. and the temperature of said cold trap is about −76° C. to about 0° C.

30. The product prepared by the process of claim 15 wherein said product is an improved water-soluble Desorbate tea extract which, upon reconstitution in water, comprises flavanols, theaflavins, thearubigins, caffeine, amino acids, and other tea compounds, in approximately the same relative amounts as a freshly brewed tea prepared from a comparable tea blend, and wherein said Desorbate tea extract is more soluble at temperatures below about 20° C. than freshly brewed tea.

31. The water-soluble Desorbate tea extract of claim 30 wherein said compounds are quantitatively and qualitatively substantially the same as that of a freshly brewed tea prepared from a comparable tea blend, as indicated by chemical/molecular weight distribution chromatagraphic analysis.

32. The improved water-soluble Desorbate tea extract of claim 31 wherein said reconstituted tea remains substantially soluble upon standing in ice.

33. The process of claim 1 wherein the process water of step (2) is treated with a minor but effective amount of an additive selected from the group consisting of suitable higher chain polyphosphates, bisulfites, sulfites, and carrageenan.

34. The process of claim 33 wherein said additive is sodium bisulfite at a level of from about 0.005 to about 0.5%.

35. The process of claim 33 wherein said sulfite is selected from the group consisting of ammonium and alkali metal sulfites.

36. The process of claim 1 or claim 33 wherein a minor amount of water is also used to pre-wet or pre-swell said upper portion of said ground tea leaves.

37. The improved water soluble tea extract of claim 12, 13, 14, 30, 31 or 32, wherein said extract is dried in a manner to provide a dried instant tea product having a density of about 0.05 to about 0.15 g/cc.

38. The improved water soluble tea extract of claim 12, 13, 14, 30, 31 or 32, wherein said extract is dried in a manner to provide a dried instant tea product having a density of about 0.08 to about 0.12 g/cc.

39. A process for making an improved water soluble tea extract having improved overall fresh brewlike tea-like aroma, flavor and flavor strength, said process comprising the steps of:
   (1) pre-wetting and pre-swelling a finite portion of a columnar bed of ground tea leaves by passing steam through said bed in such a manner so as to pre-wet and pre-swell only an upper portion of said ground tea leaves in said bed, said bed being held at a temperature of below about 65° C. and an absolute pressure of about 13 mbar to about 400 mbar;
   (2) slowly passing water and wet steam through said bed in such a manner which avoids flooding of said bed and thereby providing a moving interface between wet swollen ground tea leaves and substantially dry tea leaves until an initial aqueous tea extract breaks through said bed, said water and wet steam being applied in an amount sufficient to provide an initial aqueous tea extract having a draw-off weight ratio of extract to dry tea leaves of from 0.5:1 to 3:1, said bed being held at said temperature and said pressure until about one-half of said water and wet steam have been applied, and then maintaining a temperature in said bed below about 72° C.;
   (3) collecting said initial aqueous tea extract in a cold trap to provide said improved water soluble tea extract, said cold trap being held at an absolute pressure of about 1 to about 613 mbar and a temperature from about −180° C. to about 20° C.; and
   wherein said improved water soluble tea extract composition which, upon reconstitution in water, comprises flavanols, theaflavins, thearubigins, caffeine, amino acids, and other tea compounds, in approximately the same relative amounts as a freshly brewed tea prepared from a comparable tea blend, and wherein said tea extract is more soluble at temperatures below about 20° C. than freshly brewed tea, wherein said reconstituted tea remains substantially soluble upon cooling with ice; and
   wherein said process water of step (2) is pretreated with a low calcium lambda carrageenan at a level of from about 0.005% to about 0.5% in said process water.

40. A process for making an improved water soluble tea extract having improved overall fresh brewlike tea-like aroma, flavor and flavor strength, said process comprising the steps of:
   (1) pre-wetting and pre-swelling a finite portion of a columnar bed of ground tea leaves by passing steam through said bed in such a manner so as to pre-wet and pre-swell only an upper portion of said ground tea leaves in said bed, said bed being held at a temperature of below about 65° C. and an absolute pressure of about 13 mbar to about 400 mbar;
   (2) slowly passing water and wet steam through said bed in such a manner which avoids flooding of said bed and thereby providing a moving interface between wet swollen ground tea leaves and substantially dry tea leaves until an initial aqueous tea extract breaks through said bed, said water and wet steam being applied in an amount sufficient to provide an initial aqueous tea extract having a draw-off weight ratio of extract to dry tea leaves of from 0.5:1 to 3:1, said bed being held at said temperature and said pressure until about one-half of said water and wet steam have been applied, and then maintaining a temperature in said bed below about 72° C.;
   (3) collecting said initial aqueous tea extract in a cold trap to provide said improved water soluble tea extract, said cold trap being held at an absolute pressure of about 1 to about 613 mbar and a temperature from about −180° C. to about 20° C.; and
   wherein said improved water soluble tea extract composition which, upon reconstitution in water, comprises flavanols, theaflavins, thearubigins, caffeine, amino acids, and other tea compounds, in approximately the same relative amounts as a freshly brewed tea prepared from a comparable tea blend, and wherein said tea extract is more soluble at temperatures below about 20° C. than freshly brewed tea, wherein said reconstituted tea remains substantially soluble upon cooling with ice; and wherein said process water of step (2) is pretreated with a minor but effective amount of a mixture of sodium bisulfite and low calcium lambda carrageenan.

* * * * *